United States Patent [19]
Anderson et al.

[11] Patent Number: 5,136,666
[45] Date of Patent: Aug. 4, 1992

[54] FIBER OPTIC COMMUNICATION METHOD AND APPARATUS PROVIDING MODE MULTIPLEXING AND HOLOGRAPHIC DEMULTIPLEXING

[75] Inventors: Dana Z. Anderson; Mark E. Saffman, both of Boulder, Colo.

[73] Assignee: The University of Colorado Foundation, Inc., Boulder, Colo.

[21] Appl. No.: 741,003

[22] Filed: Aug. 6, 1991

[51] Int. Cl.$^5$ .............................. G02B 6/28
[52] U.S. Cl. ........................ 385/24; 385/27; 359/3; 359/494; 359/156; 359/159; 359/173
[58] Field of Search ............... 385/24, 25, 26, 27, 385/28; 359/3, 7, 11, 494, 495, 498, 156, 159, 173

[56] References Cited

U.S. PATENT DOCUMENTS

| | | | |
|---|---|---|---|
| 3,157,726 | 3/1960 | Hicks et al. | 385/123 |
| 3,633,034 | 1/1972 | Uchida et al. | 359/117 |
| 3,761,716 | 9/1973 | Kapron et al. | 250/199 |
| 4,062,618 | 12/1977 | Steensma | 350/3.5 |
| 4,770,485 | 9/1988 | Buckley et al. | 350/96.18 |
| 4,817,206 | 3/1989 | Calvani et al. | 359/156 |
| 4,877,297 | 10/1989 | Yeh | 350/3.68 |
| 4,955,691 | 9/1990 | Mifune et al. | 359/3 |

OTHER PUBLICATIONS

"Detector for an optical-fiber acoustic sensor using dynamic holographic interferometry," by T. J. Hall, M. A. Fidy, & M. S. Ner, Optics Letters, Nov. 1980, vol. 5, No. 11, pp. 485–487.

"Mode division multiplexing in optical fibers," by S. Berdague & P. Facq. Applied Optics, vol. 21, No. 11, pp. 1950–1955.

"Correlation-Based Fiber sensor Using a Holographic Matched Filter," by P. Zhang, K. Bennet, & G. Indebetouw, Journal of Lightwave Technology, vol. 8, No. 7, Jul. 1990, pp. 1123–1126.

Primary Examiner—Frank Gonzalez
Assistant Examiner—Phan T. Heartney
Attorney, Agent, or Firm—Francis A. Sirr; Earl C. Hancock

[57] ABSTRACT

In a fiber optic communication system, an acoustooptic modulator operates to provide a coherent light beam that is data encoded in the beam's time domain, for example by intensity modulation of the beam. A spatial light modulator then operates to address encode the beam by modulating the beam in the space domain. The resulting data and address modulated beam possesses the property of orthogonality. This beam is now transmitted to the input of a multimode optical fiber. The speckle pattern that exits the output of the optical fiber also exhibits orthogonality. This output beam is presented to a beam splitter in order to produce two spatially modulated speckle light patterns therefrom. These two beams are then focused onto photorefractive means whereat a hologram is produced. This hologram operates to address decode the beam output of the optical fiber. Detector means now operates to detect the data by receiving the beam as it is diffracted by the hologram. Ring and star interconnect networks are described.

24 Claims, 3 Drawing Sheets $$\int dA\, \vec{E}_1 \cdot \vec{E}_2 = 0$$

FIBER OPTIC COMMUNICATION METHOD AND APPARATUS PROVIDING MODE MULTIPLEXING AND HOLOGRAPHIC DEMULTIPLEXING

This invention was made with Government support under Contract #AFOSR-90-0198 awarded by the Air Force Office of Scientific Research. The Government has certain rights in the invention.

FIELD AND BACKGROUND OF THE INVENTION

This invention relates to the field of fiber optic communication, and more specifically to a method and an apparatus that provides mode multiplexing and holographic demultiplexing in the field of multimode fiber optic communication systems.

The present invention provides for the multiplexing of a number of information channels on a multimode optical fiber; thereby allowing more information to be transmitted down the fiber at a relatively low cost.

In brief, there are two general classes of optical fibers, single mode fibers and multimode fibers. Multimode fibers are generally less costly that single mode fibers, as are the input/output mechanisms that are used to inject light into the input of the fibers and to receive light from the output of the fibers.

A single mode fiber is generally of a very small diameter. Thus, all components associated with the input/output thereof are physically small and must be manufactured with high precision. By definition, single mode fibers have but one spatial channel having a large frequency bandwidth.

While multimode fibers have a cost advantage, the art has generally been unable to utilize the many communication channels or modes of these fibers, so that usually one channel of limited band width is used. One of the problems with using the many channels of a multimode fiber is the problem of demultiplexing the fiber's multi channel output.

Examples of arrangements generally useful in the practice of the present invention include U.S. Pat. No. 4,770,485 which describes a mechanical apparatus that is useful for launching separate beams into an optical fiber as first and second mode groups.

Examples of the use of multimode fibers in a communication system include, (1) the publication *OPTICS LETTERS,* Optical Society of America, November 1980, Vol. 5, No. 11, pages 485-487, which describes apparatus including a multimode fiber wherein the acoustically induced phase modulation of coherent light that is propagated by the fiber is detected by the use of an interferometer which employs an unmodulated replica of the fiber's output beam as a reference. A dynamic, adaptive, hologram provides this reference. More specifically, a hologram of the wave front emanating from the fiber at one time is interfered with the fiber wave front at another time; (2) the publication *JOURNAL OF LIGHTWAVE TECHNOLOGY,* Vol. 8, No. 7, July 1990, at pages 1039-1045, and at pages 1123-1126, which describes arrangements for measuring the correlation between the speckle radiation pattern of a multimode fiber and a reference pattern that is stored in a holographic matched filter. More specifically, a hologram is made of the output of the multimode fiber in order to record an initial state of the fiber. This matched filter hologram is then used as a reference against which changes in the fiber's output, due to the influence of axial strain and the like, is compared; and (3) U.S. Pat. No. 3,761,716 which describes an optical waveguide mode discriminator that provides a plurality of electrical signals, each signal corresponding to the information that is propagated by one of a plurality of optical modes of a multi mode optical waveguide. The output light beam of the multi mode optical waveguide, i.e. the beam containing the plurality of optical modes, is then processed by a plurality of mode discriminator optical waveguides which operate to selectively transmit only certain of the optical modes. The output beams of these mode discriminator optical waveguides are then detected, and the resulting electrical signals are processed in a manner to obtain one electrical signal for each of the optical modes. This patent also cites U.S. Pat. No. 3,157,726 for its teachings relative to the use of the optical and physical properties of an optical fiber, such that the separate modes thereof can be used as channels for the independent but simultaneous transmission of different information on each channel, and cites U.S. Pat. No. 3,711,267 as an exemplary multi mode optical waveguide for use therein.

Examples of fiber optic arrangements providing mode multiplexing include, (1) the publication *APPLIED OPTICS,* Vol. 21, No. 11, 1 Jun. 1982, at pages 1950-1955, which describes apparatus having mode division multiplexing, the apparatus including a multimode graded index optical fiber and a bimodal spatial mode filter which is located at the input of the optical fiber; and (2) U.S. Pat. No. 4,062,618 which describes a spatially multiplexed optical communication system wherein demodulation is accomplished by the use of holographic matched filtering. In this system a holographic system 1 receives a plurality of intelligence signals S1-Sn and operates on these intelligence signals to provide a plurality of spatially modulated and superimposed optical beams, each of which is modulated with a different one of the intelligence signals. This plurality of spatially modulated optical beams is then presented to the input of an optical waveguide 5. The output of the waveguide is coupled to a hologram 6, whereat the plurality of multiplexed optical beams are demultiplexed and reconstructed as individual signals at the individual photosensors of a photosensor array 7, thereby recovering the original plurality of intelligence signals S1-Sn. In FIG. 1 of this patent the optical waveguide comprises a parabolic index type (self focusing) optical fiber. The holographic system that is located at the input of this optical fiber is of the type shown in U.S. Pat. No. 3,612,641. In this device the known type of input hologram 21 of FIG. 3 is also used at output hologram 6 of FIG. 1 for the purpose of demultiplexing.

U.S. Pat. No. 4,877,297 describes a reconfigurable optical interconnection device that uses a spatial light modulator and a dynamic holographic medium in the form of a photorefractive crystal.

U.S. Pat. No. 3,633,034 describes a time division and space division multiplexed optical communication system that employs an optical fiber, wherein the refractive index of the fiber, as observed in a cross section normal to the fiber's axis, is highest at the axis and gradually decreases toward the outer circumference of the fiber. In this device a plurality of input laser beams are each separately modulated (i.e. by the use of a polarization plane rotating means and an analyzer) by an information signal and then made incident upon the input end surface of the optical fiber, each beam being incident thereon at a different angle. The axial length of the fiber is chosen to be of a critical length, so that the plurality of light beams now leave the exit end surface of the optical fiber at angles that are equal to angles at which the beams were incident on the input end surface of the optical fiber. These spatially separated exit beams are then separately demodulated by the use of a plurality of detectors. In place of a plurality of detectors, a time division multiplexed transmission (FIG. 4) can be separated by the use of an electronic rotary switch or an optical channel distributor (FIGS. 3 and 5).

While the various means contained in the prior art are generally useful for their intended purpose, a need remains for a method and an apparatus which will increase the information carrying capacity of a multimode optical fiber.

SUMMARY OF THE INVENTION

The present invention provides a fiber optic communication method and apparatus that utilizes the many modes that are available on a multimode optical fiber, thereby increasing the information carrying capacity of this type of optical fiber. Each individual information channel that is provided by the invention is of limited bandwidth. However, by increasing the number of communication channels, the information carrying capacity of the invention is increased by as much as an order of magnitude over that which is found in the prior use of multimode optical fibers.

The present invention utilizes the principle that when an orthogonal light beam or beams are launched into a multimode fiber, the beams that exit the fiber largely retain their orthogonal characteristic, independent of any physical changes that may occur in the fiber with time, such as for example mechanical stress of the fiber. It is important to note that two signals injected at different points along a multimode fiber will also tend to be nearly orthogonal, simply because there are so many modes within the fiber. In fact, the orthogonality of two such signals can be exactly estimated.

In accordance with the invention, the data carried by the various information channels is time, or time domain, encoded or modulated onto a coherent light beam. This time modulated beam is thereafter space, or space domain, modulated by the use of a spatial light modulator. In this way, each information channel is given a specific address. The time/space modulated beam is now injected into a multimode fiber. As is well known, a speckle pattern now exits the fiber. A hologram is now constructed by the use of this speckle pattern, for example by the use of a photorefractive medium or crystal that is located at the output of the fiber. The speckle pattern beam is now directed onto the hologram, in order to address decode the beam. As a result of the beam diffraction that occurs at the hologram, the beam is directed to one or more addressed beam sensors.

As a feature of the invention, a dynamic hologram is used as a dynamic address memory element at the output of the multimode optical fiber, the hologram being periodically updated or refreshed.

An object of the invention is to provide a fiber optic communication system for transmitting information from a transmitting location to a receiving location wherein a multimode fiber optic is provided having an input located at the transmitting location and having an output located at the receiving location.

An acoustooptic modulator at the transmitting location operates to produce a time, or time domain, modulated coherent light signal that contains the information in the time modulation of the signal. A spatial light modulator at the transmitting location receives this time modulated light signal, and operates to address the time modulated light signal to a receiving location by way of spatial, or space domain, modulation thereof.

The time/space modulated light signal is then transmitted to the input of the multimode optical fiber. As a result, the optical fiber produces a speckle pattern at the output thereof whose speckle characteristic is unique to the spatial modulation of the beam.

A beam splitter at the output of the optical fiber operates to produce a pair of speckle patterns from this output. A photorefractive member now receives the two speckle patterns, and operates to produce an index grating or diffraction pattern therefrom that is unique to the beam's spatial modulation.

Thereafter, one of the two speckle patterns is diffracted from the index grating, and a detector operates to receive the diffracted speckle pattern to thereupon recover the time modulation of the beam.

These and other features and advantages of the invention will be apparent to those of skill in the art upon reference to the detailed description of the invention, which description makes reference to the drawing.

DETAILED DESCRIPTION OF THE INVENTION

Figures 1, 4:
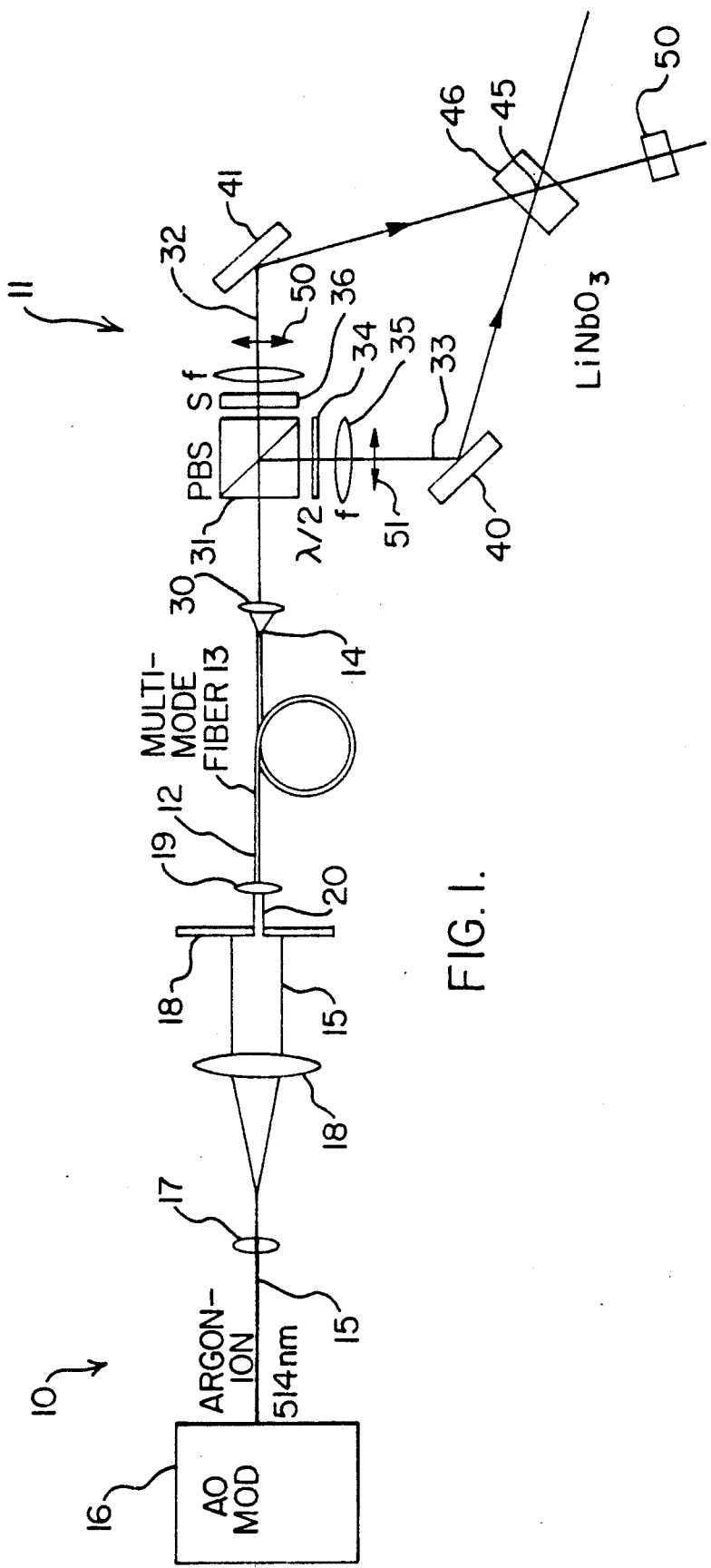
FIG. 1 shows a form of the invention wherein information or data is transmitted from a transmitting location to a receiving location.
FIG. 4 is an equation that is useful in understanding the term orthogonal, as the term is used herein.

In accordance with the present invention, spatial mode multiplexing is used to transmit several communication channels on a single multimode optical fiber. The information content of each channel is carried by way of time modulation of a coherent light beam, whereas the destination address of each channel is carried by way of space modulation of the coherent light beam.

Each individual one of the communication channels is established or encoded onto the coherent light beam by the use of an orthogonal pattern that is unique to each channel. The various orthogonal patterns are selectively established, one for each communication channel, by the operation of a spatial light modulator that is physically located at an input or transmitting end of the multimode optical fiber. As a result, a unique output speckle pattern is established at the output or receiving end of the multimode optical fiber for each one of the individual communication channels.

A photorefractive medium is located at the receiving end of the multimode optical fiber. This photorefractive medium holographically decodes the fiber's output speckle pattern, and as a result of diffraction of the output speckle pattern by an addressed hologram, the speckle pattern is diffracted or directed to an output detector for an addressed channel.

In summary, at a transmitting end of the multimode optical fiber, time signals are encoded onto the coherent light beam by the use of modulation techniques such as amplitude or phase modulation, and the address is encoded onto the time modulated beam by the use of a spatial light modulator.

At the receiving end of the optical fiber the address to which the time modulated signals are directed is decoded by interfering the fiber's output speckle pattern with itself at a hologram that is unique to the addressed location. As a result, the fiber's output beam is diffracted to a detector which decodes the time modulated information or data that is carried by the beam.

Fiber output speckle patterns that are derived from input patterns that are orthogonal to the ones that were initially used to write the hologram will not give rise to a strong reconstructed object beam, since no diffracted light signal is produced from the hologram when the speckle pattern incident thereon is orthogonal to the speckle pattern that was used to initially write the hologram.

The present invention operates upon the principle that when the input of a multimode optical fiber is illuminated, the output of the fiber comprises a complicated speckle pattern that arises from interference between the fiber's many light transmission modes. It is generally difficult, if not impossible, to determine the form of this speckle pattern in view of the large number of fiber optic propagating modes.

The present invention, however, insures that the input end of such a multimode optical fiber is illuminated by pairs of different optical fields that are electric-field orthogonal at the input reference plane of the fiber. In accordance with the invention, it is not required that the fiber's output speckle pattern be known, since irrespective of the form of the output speckle pattern, the output speckle pattern obtained from the multimode optical fiber will always retain its original input orthogonality or field amplitude orthogonal characteristic.

FIG. 4 is useful in understanding the term orthogonal as it is used herein. In this equation, the indicated integration extends over the optical fiber's input plane, and the equation's two electric field terms are the optical fiber's two input plane electric fields.

In accordance with the invention each of the fiber's output speckle patterns is split into two identical beams, and interference of these two beams is used to construct a plurality of holograms that are each individually unique to an individual one of the communication channels.

Thereafter, each individual speckle pattern output from the multimode fiber will be detected only by its addressed hologram, and in this way each of the fiber's output speckle patterns is diffracted only to an addressed detector for the addressed channel.

The invention's technique for signal multiplexing on a multimode fiber is based on the unitary principle, and capitalizes on the high dimensionality of the fiber's output speckle pattern.

When an electric field propagates through a multimode optical fiber, the fiber's output speckle pattern can be described mathematically as the result of an operator that operates on the fiber's input. In accordance with the invention, the mathematical operator has the property that if the fiber inputs are orthogonal, then the fiber outputs are also orthogonal. Such operators are known as unitary operators.

A typical multimode fiber provides an output speckle pattern that contains roughly 10,000 individual speckles. The number of individual speckles in the output pattern comprises the dimensionality of the output speckle pattern.

The terms time modulation and time domain modulation as used herein, and the terms space modulation, space domain modulation and spatial modulation as used herein, can be visualized by considering an X-Y-Z coordinate system. The described beam(s) of coherent light is considered to travel generally in the Z direction within this coordinate system. The information or data to be transmitted from one location to another is time modulated or time domain modulated on this beam generally in the Z direction. The beam(s) is addressed to said another location by way of space modulation, space domain modulation or spatial modulation that takes place generally in the X-Y plane of this coordinate system.

FIG. 1 shows a form of the invention wherein information or data is transmitted from a transmitting location 10 to a receiving location 11. The various means at transmitting location 10 are operatively associated with the input end 12 of a multimode optical fiber 13 of well known construction. The various means at receiving location 11 are operatively associated with the output end 14 of multimode optical fiber 13.

For purposes of simplicity, FIG. 1 shows only one transmitting location and one receiving location. As will be apparent to those of skill in the art, bidirectional communication can be provided between locations 10 and 11 in accordance with the invention. Also, more than two locations can be connected to form a multi station fiber optic communication network in accordance with the invention, as will be described.

At transmitting location 10, a coherent light beam 15, for example a laser beam, is modulated in the time domain, for example beam 15 is amplitude or phase modulated, by the use of an acoustooptic modulator 16 of well known construction. The time domain modulation technique that is used to modulate beam 15 is not critical to the invention. All that is essential is that the information or data that is to be transmitted from transmitting location 10 to receiving location 11, for example analog or binary information, be encoded on beam 15 by way of modulation of the beam in the time domain, i.e. the information that is to be transmitted from transmitting location 10 to receiving location 11 by way of beam 15 is recorded or modulated in time, i.e. in the direction of beam propagation.

Time modulated beam 15 is now processed by a pair of lenses 17 and 18, whereupon the beam is presented to a spatial light modulator (SLM) generally represented by reference numeral 18. The type of SLM that is used is not critical to the invention. What is critical is that SLM 18 provide a space domain modulation of beam 15 that uniquely identifies receiving location 11 and only this receiving location, i.e. the destination address of the time modulated information that is to be transmitted from transmitting location 10 to receiving location 11 by way of beam 15 is recorded or modulated in space extending normal to beam 15.

By way of example a simple form of SLM 18 may comprise a piece of glass that is mounted at an oblique angle to beam 15, such that the angular position of the piece of glass selects or determines the input angle at which time/space modulated beam 20 enters the input end 12 of fiber 13. This unique angular position of the piece of glass operates to provide a unique space modulation of beam 20, and this unique space modulation operates as a unique address for receiving location 11.

A lens 19 operates to present the time/space modulated beam 20 to the input end 12 of multimode optical fiber 13. As is well known to those of skill in the art, the output of optical fiber 13 will now comprise a speckle pattern area whose area composition generally comprises 50% of illuminated specks or areas that are viewed against a dark background, the dark background also comprising generally 50% of the total area of the fiber's output speckle pattern.

At the receiving location 11, the fiber's output speckle pattern is processed by lens 30 and then presented to a polarizing beam splitter (PBS) 31. As a result of the operation of PBS 31, the polarization components of the fiber's output speckle pattern are separated into two separate speckle pattern beams 32 and 33. Half wave plate 34 operates to rotate the polarization of beam 33 such that the polarization of the two beams 32,33 are thereafter the same, i.e. both beams are polarized in the plane of FIG. 1, as is represented by arrows 50 and 51. As shown in FIG. 1, each of these two beams is provided with a lens that operates to focus the beam on crystal 46.

After speckle pattern beam 33 is processed by a half wave plate 34 and lens 35, the beam 33 impinges upon mirror 40.

At this point in the description, it will be assumed that shutter 36 is open, thus allowing speckle pattern beam 32 to pass to, and impinge upon, mirror 41.

As a result of the operation of mirrors 40 and 41, speckle pattern beams 32,33, of like polarization 50,51, meet or are focused on a point 45 in space. The location of point 45 is occupied by a photorefractive means 46, for example a photorefractive lithium/niobium/oxygen (LiNbO3) crystal of well known construction. A volume hologram is thus formed in crystal 45, that is, the beam interference pattern that is produced over the entire intersection 45 of the two speckle pattern beams 32 and 33 is recorded as a volume hologram in crystal 46. For purposes of simplicity this hologram is not numbered in FIG. 1.

Once crystal 46 is thus written, to thereby establish the address of receiving location 11, shutter 36 can be closed. Thereafter, whenever SLM 18 of transmitting location 18 is controlled to provide the required spatial modulation of beam 15, for example the required angle of injection of beam 20 into the input end 12 of fiber 13, a time/space modulated beam 20 will be injected into the input of fiber 13, and the output speckle pattern beam 33 will be diffracted from the hologram that is contained within crystal 46, such that the diffracted beam will impinge upon a photodetector 50 whereat the speckle pattern's time modulation is detected.

As will be appreciated by those of skill in the art, the address hologram within crystal 46 can be periodically rewritten or refreshed as needed merely by opening shutter 36.

In general terms, FIG. 1 comprises a fiber optic communication system for transmitting information from transmitting location 10 to receiving location 11. Multimode fiber optic means 13 has its input 12 located at transmitting location 10 and has its output 14 located at receiving location 11. Coherent light generating means 15 is located at transmitting location 10, as is means 16,18 operable to time domain and space domain modulate the coherent light. Thereafter light contains information in the time domain modulation thereof, and the address of receiving location 11 in the space domain modulation thereof. A means 19 then provides the time and space domain modulated coherent light to the input 12 of fiber optic means 13. Fiber optic means 13 thus operates to provide a speckle pattern at the output 14 thereof, the dot distribution characteristic of this speckle pattern being unique to the space domain modulation. A means 31,34, including beam spitter means 30, at the output 14 of fiber optic means 13, operates to receive this speckle pattern, and operates to produce two like-polarized speckle patterns 32,33 therefrom. Photorefractive means 46 receives the two like-polarized speckle patterns 32,33, and operates to produce an interference pattern therefrom, this interference pattern being unique to the space domain modulation. Thereafter, one of the two speckle patterns 32,33 is diffracted from this interference pattern, and detector means 50 operates to receive the diffracted speckle pattern, detector means 50 then being operable to recover the time domain modulation from the diffracted speckle pattern.

Figure 2:
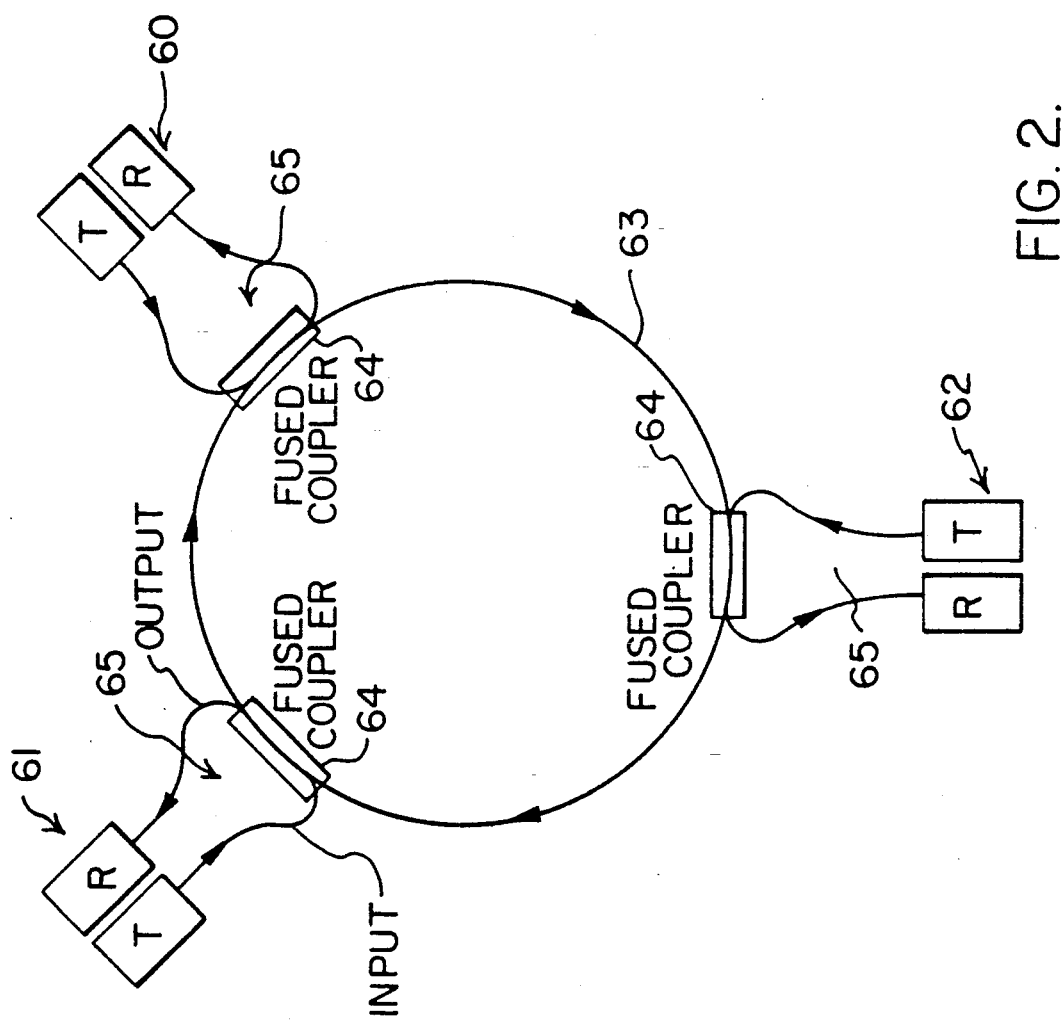
FIG. 2 shows an embodiment of the invention wherein three communication nodes or locations are interconnected in a bidirectional ring architecture communication configuration.

With reference to FIG. 2, three transmitter/receiver nodes or communication locations 60, 61 and 62 are shown interconnected in a ring architecture configuration in accordance with the invention. Each of the locations, nodes or stations 60–62 include (1) a transmitting portion T that is constructed and arranged in the manner of FIG. 1's transmitting location 10, and (2) a receiving portion R that is constructed and arranged in the manner of FIG. 1's receiving location 11.

More specifically, each transmitter T shown in FIG. 2 includes (1) an acoustooptic modulator that provides a time domain modulated coherent light signal, the time domain modulation comprising the information or data that is to be transmitted to another location within the ring architecture, and (2) a spatial light modulator that provides space domain modulation of the light signal, the space domain modulation comprising the address of said another location within the ring architecture to which said information is to be transmitted.

In the ring architecture of FIG. 2 the coherent light sources within each transmitter T can be mutually incoherent.

In embodiments of the invention, the order in which beam modulation occurs is not critical. However, it is usually more convenient to first time modulate the beam, followed by space modulation of the beam. Reversing the order of modulation may result in distortion of the beam's desired space modulation by the subsequent time modulation of the beam.

Each receiver R shown in FIG. 2, includes (1) a polarizing beam splitter that operates to provide two speckle pattern beams such that address holograms can be written into (2) a photorefractive means, and (3) a detector to detect the information being transmitted to that station from another station within the ring architecture system.

The ring portion of FIG. 2 comprises an endless multimode optical fiber 63 that includes a number of passive mode fused couplers 64, one coupler being provided for each of the stations 60–62.

Each of the couplers 64 couples the speckle pattern within ring 63 to an individual multimode fiber optic link 65 that is associated with each of the individual stations 60–62.

In operation, each of the stations 60-62 is operated to write a unique address hologram to each of the other stations 60-62. In this way each station is enabled to selectively address each of the other stations. For example, station 61 is operated so that its spatial light modulator space modulates its transmitted light signal with space domain modulation that addresses station 60. At the same time, the shutter (see shutter 36 of FIG. 1) for station 60 is opened, and the corresponding shutters for stations 61 and 62 is maintained closed. In this way, an address hologram is written into the photorefractive means of station 60. This hologram comprises the means whereby station 61 thereafter operates to address station 60 by way of a space domain modulated coherent light signal that is transmitted to ring fiber 63 by station 60.

In a like manner, station 61 writes a different address hologram to station 62, and each of the other stations 60 and 62 likewise write address holograms into the other stations of the ring architecture configuration.

As a result, each photorefractive means of each individual station 60-62 is provided with two address holograms which enable bidirectional communication between the three stations 60-62 of the ring architecture configuration.

As with all embodiments of the invention, it may be desirable to periodically rewrite or refresh the address holograms that are stored in the various photorefractive means within the fiber optic communication system, since mechanical perturbations to the optical fibers will tend to cause fluctuations to occur in the speckle patterns, leading to reduced diffraction efficiency by the address holograms, and leading to increased crosstalk within the fiber optic communication system.

As a feature of the invention, a twin optical fiber bus structure can be provided, in which case one fiber bus is used while the photorefractive means that is associated with the other fiber bus is refreshed. In this feature of the invention it may be helpful to use high speed photorefractive materials, such as bismuth/silicon oxide (BSO) ($Bi_{12}SiO_{20}$) or gallium/arsenide (GaAs) photorefractive crystals.

In the ring architecture of FIG. 2 the transmitters of the various communication locations 60-62 may be mutually incoherent. However in the star architecture of FIG. 3 (to be described), the communication interconnecting holograms in crystal 146 are formed by the interference of two speckle patterns that are derived from two separate ones of the communication locations 70-72 of FIG. 3. That is to say, in the ring architecture of FIG. 2, holograms are written in a crystal by interfering two speckle patterns that are derived from a single transmitter T. Whereas in the star architecture of FIG. 3, the holograms are written by interfering two speckle patterns that originate as one pattern from each of two different transmitters T. In the star architecture, if these two different transmitters were not mutually coherent, then no interference pattern and no hologram would be formed. This requirement of mutual coherency is not however found in the ring architecture since different transmitters are not interfered when writing a hologram.

In general terms, FIG. 2 comprises a ring configuration fiber optic communication system for transmitting information from one communication node 60-62 to another communication node within the ring configuration. Each communication node 60-62 has a transmitting portion T and a receiving portion R. A ring shaped multimode fiber optic means 63 includes like plurality of fiber couplers 64, one coupler being associated with one of the communication nodes 60-62. Each coupler 64 has its output associated with the receiving portion R of a communication node, and has its input associated with the transmitting portion T of the same communication node.

Each of the transmitting portions T comprises (1) a coherent light source that provides a light beam, (2) means operable to time domain modulate its light beam to containing information to be communicated from the transmitting portion T of one node to the receiving portion R of another node, (3) means operable to space domain modulate its light beam so as to address the light beam to the receiving portion R of the other node, and (4) means providing its time/space domain modulated light beam to the input of its coupler 64.

Ring shaped multimode fiber optic means 63 then operates to provide a speckle pattern to the output of each of the plurality of couplers 64.

Each of the receiving portions R comprises (1) beam spitter means operable to receive the speckle pattern from the output of its coupler 64, and to produce two like-polarized speckle patterns therefrom, (2) photorefractive means operable to receive the two like-polarized speckle patterns, and operable to produce a holographic interference pattern therefrom, the holographic pattern having a diffraction characteristic forming a unique addresses for this receiving portion R, (3), and (4) detector means operable to receive one of the two like-polarized speckle patterns, as that pattern is diffracted from the interference pattern in accordance with the space domain modulation of the speckle pattern, the detector means then operating to recover the time domain modulated information from the diffracted speckle pattern.

More specifically, each of the transmitting portions T includes (1) acoustooptic modulator means operable to time domain modulate its light beam, and (2) spatial light modulator means operable to space domain modulate its light beam.

Figure 3:
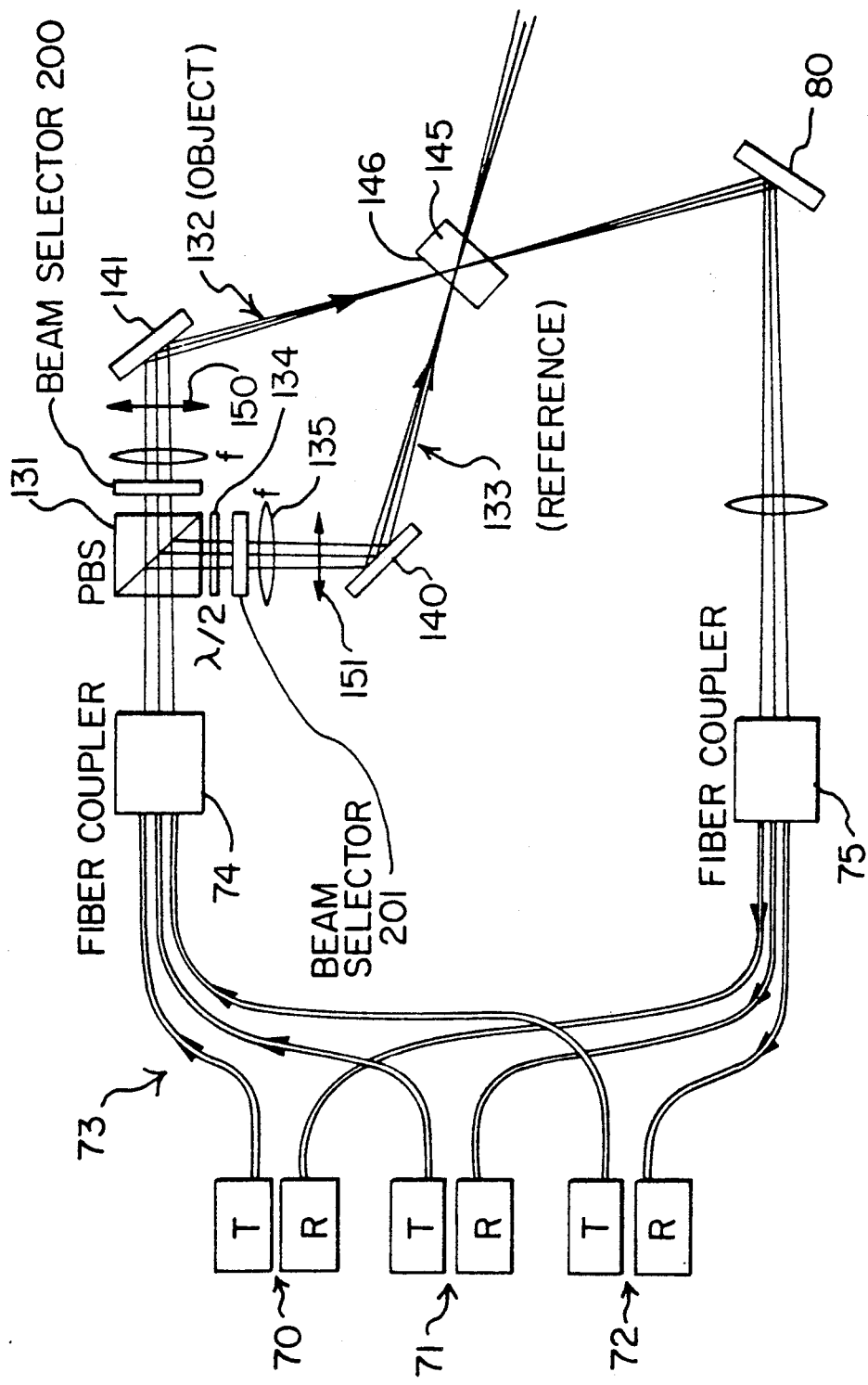
FIG. 3 shows an embodiment of the invention wherein three communication nodes or locations are interconnected in a bidirectional star architecture communication configuration.

With reference to FIG. 3, an embodiment of the invention is disclosed wherein three communication nodes or locations 70, 71 and 72 are interconnected in a bidirectional star architecture communication configuration or system in accordance with the invention.

In this configuration six multimode fiber optic members within the communication system are generally defined as a group by reference numeral 73. As shown, two individual multimode fibers are associated with each of the three nodes 70-72, one fiber being associated with the transmitter T thereof and the other fiber being associated with the receiver R thereof.

In this star system, all physically spaced transmitter fibers 73 are connected to an input fiber coupler 74 of well known construction, and all physically spaced receiving fibers 73 are connected to an output fiber coupler 75 of well known construction.

Fiber couplers 74 and 75 provide the input and the output, respectively, for a hologram structure that is generally similar to that shown at receiving location 11 of FIG. 1. In FIG. 3, similar structural elements are assigned a number that is 100 units higher than the similar element carries in FIG. 2. For example, reference numeral 146 of FIG. 3 identifies a photorefractive means.

In general terms input fiber coupler 74 and an output fiber coupler 75 each have N (N=3) physically spaced optical fiber couplings on the left hand side thereof, and N physically spaced light beam positions, corresponding to the spacing of the fiber couplings, on the right hand side thereof.

Polarizing beam splitter 131 operates to receive as many as N spaced beams from input coupler 74, and operates to split each received bean to follow a reference beam path 133 and spaced object beam path 132. Half wave plate 134 is located in reference beam path 133. A first beam selector 201 is located in reference beam path 133, and a second beam selector 200 is located in object beam path 132.

A photorefractive means 146 includes mirrors 140 and 141 that are operable to focus reference beam path 133 and object beam path 132 on photorefractive means 146.

In operation, control of first and second beam selectors 201,200 operates (1) to select an object beam 132 from one of a pair of node transmitters, and (2) to select a reference beam 133 from the other of the pair of node transmitters. This beam selection is operable to write a unique interference pattern in photorefractive means 146 identifying this selected pair of nodes as a receiver/transmitter pair. In this way, N(N−1) interference patterns are written in photorefractive means 146, such that upon input coupler 74 receiving a light beam that is space domain addressed to a node, this received light beam is diffracted from one of the N(N−1) interference patterns to the addressed one of the output fiber connections of output coupler 75.

More specifically, polarizing beam splitter 131 and half wave plate 134 operate to provide two three-beam groups 132 and 133. The six individual beams within beam groups 132,133 are, for example, polarized in the plane of FIG. 3, as shown by arrows 150,151. For purposes of the following explanation of how address holograms are written to photorefractive means 146, the three beams within group 132 will be called object beams, and the three beams within group 133 will be called reference beams.

Each of the beam groups 132,133 is provided with a beam selector 200,201, respectively. The construction of beam selectors 200,201 is conventional and is well known to those skilled in the art. In essence, each of the two beam selectors 200,201 comprise three shutters that are controllable to select one or none of the three spatially separated beams that are presented thereto by operation of polarizing beam splitter 131.

As shown in FIG. 3, input fiber coupler 74 provides three spatially separated input or transmitter beams to polarized beam splitter 131, one input beam for each of the three input fibers 73 that are individually associated with the three communication nodes 70–72. Fiber coupler 75 operates to receive three spatially separated output beams from mirror 80, one output beam for each of the three individual output or receiver fibers 73 that are associated with the three communication nodes 70–72.

While three spatially separated beams are shown exiting input coupler 74, and three spatially separated beams are shown entering output coupler 75, it will be appreciated that the number of such beams existing at any given time is actually a function of the node-to-node communication that is taking place at that time.

The transmitter T of each of the communication locations 70–72 includes (1) an acoustooptic modulator that provides a time domain modulated coherent light signal, the time domain modulation comprising the information or data that is to be transmitted to another location within the star system, and (2) a spatial light modulator that provides space domain modulation of the light signal, the space domain modulation comprising the address of said another location within the star system to which said information is to be transmitted.

In the star system of FIG. 3 interconnection between the various communication nodes is achieved by way of holograms within photorefractive means 146, these holograms being written by speckle interference patterns that are provided by pairs of the modes, one node of each pair being identified as a transmitter and the other node of each pair being identified as a receiver. As a result, the coherent light source within each of the nodes of the star system must be mutually coherent, as was previously explained.

The star system differs from the ring system of FIG. 2 in that each receiver R shown in FIG. 3, includes only a detector that is associated with its input fiber 73, and is operable to detect only the information that is transmitted to that node's transmitter fiber 73.

In the star system all address holograms (equally the number six for the three node system of FIG. 3) are contained within photorefractive means 146.

In operation, each node 70–72 is operative to write two address holograms in photorefractive means 146, one hologram for each of the other two nodes in the star system. In this way each node 70–72 is enabled to thereafter address a selected one of the two other nodes.

Assume for example that transmitter T of node 70 is operated so that its spatial light modulator space modulates its transmitted light beam with space domain modulation that addresses node 71. In this way, an address hologram is written into photorefractive means 146. This hologram comprises the means whereby node 70 thereafter operates to address node 71 by way of a space domain modulated coherent light beam or signal that is transmitted to input fiber coupler 74 by the transmitter fiber 73 that is associated with node 70.

In a like manner, node 70 is controlled to write a different address hologram in photorefractive means 146 in order to address node 72, and each of the other nodes 71 and 72 likewise write address holograms into photorefractive means 146 for the two other nodes of the star communication system.

As a result, photorefractive means 146 is provided with six address holograms which enable bidirectional communication between the three nodes 70–72 of the star system.

Again, it may be desirable to periodically rewrite or refresh the address holograms that are stored in photorefractive means 146.

As stated previously, the star system of FIG. 3 is initialized, i.e. address holograms are written to photorefractive means 146, by having pairs of the modes 70–72 transmit simultaneously. The two speckle patterns that are thus received, one from the intended transmitter and one from the intended receiver, are selected as a reference beam and an object beam, respectively, as a hologram is written in photorefractive means 146. Thereafter, when the transmitter mode wishes to communicate with the receiver mode, space domain modulation of the transmitting nodes beam provides the required communication link to the receiver by way of this prewritten hologram.

More specifically, for the exemplary star system of FIG. 3, three transmitters and three receivers are provided. At polarizing beam splitter 131 each of the three beams received from coupler 74 are split into two beams. For purpose of explanation, the three beams 132 that strike mirror 141 are called object beams, and the three beams 131 that strike mirror 140 are called the reference beams.

In order to initialize the communication system, for example to write a hologram connection transmitting mode 70 to receiving node 71, the object beam from receiving node 71 is interfered with the reference beam from transmitting node 70. That is, beam selector 200 is controlled to select only the object beam 132 that is received from receiving node 71, and beam selector 201 is controlled to select only the reference beam 131 that is received from transmitting node 70.

In like manner, in order to write a hologram that will later operate to connect transmitting mode 70 to receiving node 72, beam selector 200 is controlled to select the object beam from receiving node 72, beam selector 201 is controlled to select the object beam from transmitting 70, and a hologram is written to photorefractive means 146.

This process is repeated until holograms have been written enabling all modes to transmit and receive relative to all other nodes within the star system.

Thereafter, all of the object beams 132 are blocked by operation of beam selector 200, as all of the reference beams are unblocked by operation of beam selector 201. The star communication system has now been initialized, i.e. all possible optical interconnection links have been holographically stored in photorefractive means 146.

In order for one mode to thereafter address another node, for example in order for mode 70 to address node 71, transmitting node 70 spatially modulates its transmitted beam 133 with the same space domain modulation that was previously used as a hologram was written using the object beam 132 from node 71. As a result, the reference beam from mode is refracted from the hologram in a manner to provide an input to coupler 75 that is physically spaced so as to impact the receiving fiber 73 that is associated with node 71. In the various embodiments of the invention, the coherent light source that is associated with each transmitter portion can be provided from a single coherent source, such as a high power laser, or each transmitter can be provided with its own individual coherent source.

While the invention has been described in detail while making reference to various embodiments thereof, it is apparent that those skilled in the art will, upon reading this description, readily visualize yet other embodiments that are within the spirit and scope of this invention. Thus it is intended that the spirit and scope of the invention be as is defined in the following claims, and their equivalents.

What is claimed is:

1. A fiber optic communication system for transmitting information from a transmitting location to a receiving location, comprising;

multimode fiber optic means having an input located at said transmitting location and having an output located at said receiving location, coherent light generating means at said transmitting location, means at said transmitting location operable to time domain modulate said coherent light so as to containing said information in time domain modulation of said coherent light, and operable to address said coherent light to said receiving location by way of space domain modulation of said coherent light, means providing said time and space domain modulated coherent light to the input of said fiber optic means, said fiber optic means thus operating to provide a speckle pattern at the output thereof, said speckle pattern being unique to said space domain modulation, means including beam splitter means at the output of said fiber optic means operable to receive said speckle pattern and operating to produce two like-polarized speckle patterns therefrom, and photorefractive means receiving said two like-polarized speckle patterns, and operable to produce an interference pattern therefrom, said interference pattern being unique to said space domain modulation.

2. The communication system of claim 1 wherein one of said two speckle patterns is diffracted from said interference pattern, and including detector means operable to receive said one diffracted speckle pattern, said detector means being operable to recover said time domain modulation from said one diffracted speckle pattern.

3. The communication system of claim 2 wherein said transmitting location includes, acoustooptic modulator means operable to time domain modulate said coherent light so as to containing said information in the time domain modulation thereof, and spatial light modulator means operable to address said coherent light to said receiving location by way of space domain modulation thereof.

4. The communication system of claim 3 wherein said means including beam splitter means includes;

polarizing beam splitter means operable to receive said speckle pattern and to produce a first and a second speckle pattern therefrom, and half wave plate means operable to control the polarization of said first speckle pattern to have the same polarization as said second speckle pattern.

5. The communication system of claim 4 wherein said photorefractive means comprises a photorefractive crystal.

6. The communication system of claim 5 including mirror means operable to receive said first and second speckle patterns, and operable to focus said first and second speckle patterns at a common location on said crystal means.

7. The communication system of claim 6 wherein said interference pattern is holographically stored in said photorefractive crystal, and wherein said stored hologram pattern is periodically restored.

8. The communication system of claim 7 wherein said photorefractive crystal is a lithium/niobium/oxygen crystal.

9. A method providing fiber optic communication of information from a transmitting location to a receiving location, comprising the steps of;

providing an elongated multimode optical fiber extending between said transmitting location and said receiving location, providing a coherent light beam at said transmitting location, time domain modulating said coherent light beam in accordance with said information, space domain modulating said coherent light beam in a manner to address said light beam to said receiving location, providing said time and space domain modulated light signal to one end of said elongated optical fiber, said optical fiber thus operating to provide an output speckle pattern at said receiving location, said output speckle pattern being unique to said space domain modulation, producing two like-polarized speckle patterns from said output speckle pattern, producing a holographic interference pattern from said two like-polarized speckle patterns, said holographic interference pattern being unique to said space domain modulation, interrupting one of said two like-polarized speckle patterns, so as to cause the other of said two like-polarized speckle patterns to be diffracted from said holographic interference pattern, and detecting said diffracted speckle pattern so as to recover said time domain modulated information at said receiving location.

10. The method of claim 9 including the steps of providing acoustooptic modulator means operable to time domain modulate said coherent light beam, and providing spatial light modulator means operable to address said coherent light beam to said receiving location.

11. The method of claim 10 wherein the step of producing said holographic interference pattern includes the steps of;

providing said output speckle pattern to polarizing beam splitter means that operates to produce a first and a second speckle pattern therefrom, providing half wave plate means to control the polarization of said first speckle pattern, to thereby produce a third speckle pattern having the same polarization as said second speckle pattern, providing photorefractive means, and focusing said second and third speckle patterns on said photorefractive means.

12. The method of claim 11 including the step of periodically restoring said holographic interference pattern.

13. A method of providing fiber optic communication from a transmitter physical location to an addressed receiver physical location, comprising the steps of;

providing elongated multimode optical fiber means having an input located at said transmitter location, and having an output located at said receiver location, providing coherent light beam means at said transmitter location, providing acoustooptic means at said transmitter location to time domain data encode said light beam, providing spatial light modulator means at said receiver location to space domain address encode said light beam, transmitting said time/space domain encoded light beam to the input of said optical fiber means, to thereby generate a speckle pattern output beam at the output of said optical fiber means, forming two like-polarized speckle pattern beams from said output beam, providing photorefractive means, transmitting said two like-polarized speckle pattern beams to said photorefractive means in a manner to interfere at said photorefractive means, to thereby generate holographic means containing a refractive pattern determined by said space domain address encoding, transmitting at least one of said two like-polarized speckle pattern beams onto said holographic means to produce a refracted beam in accordance with said space domain address encoding, and providing beam detector means located so as to intercept said refracted beam, said beam detector means operating to detect said time domain encoded data.

14. The method of claim 13 including the step of time domain encoding said light beam prior to space domain encoding of said light beam.

15. A ring configuration fiber optic communication system for transmitting information from one communication node to another communication node within said ring configuration, comprising;

a plurality of communication nodes, each node having a transmitting portion and a receiving portion, ring shaped multimode fiber optic means including a like plurality of light couplers, one coupler being associated with one of said communication nodes, each coupler having an output associated with the receiving portion of a communication node, and having an input associated with the transmitting portion of the same communication node, each of said transmitting portions comprising;

coherent light source means providing a light beam, means operable to time domain modulate said light beam to containing information to be communicated from the transmitting portion of one node to the receiving portion of another node, means operable to space domain modulate said light beam so as to address said light beam to said receiving portion of said another node, means providing said time/space domain modulated light beam to the input of a coupler, said ring shaped multimode fiber optic means then operating to provide a speckle pattern to the output of each of said plurality of couplers, each of said receiving portions comprising;

beam splitter means operable to receive said speckle pattern and to produce two like-polarized speckle patterns therefrom, photorefractive means operable to receive said two like-polarized speckle patterns, and operable to produce a holographic interference pattern therefrom, said holographic pattern having a diffraction characteristic forming a unique addresses for said receiving portion, and detector means operable to receive one of said two like-polarized speckle patterns, as said one pattern is diffracted from said interference pattern in accordance with the space domain modulation of said one pattern, said detector means operating to recover said time domain modulated information from said one diffracted pattern.

16. The ring configuration communication system of claim 15 wherein each of said transmitting portions includes, acoustooptic modulator means operable to time domain modulate said light beam, and spatial light modulator means operable to address said time domain modulated light beam by way of a space domain modulation characteristic thereof.

17. The ring configuration communication system of claim 16 wherein said beam splitter means includes;
   polarizing beam splitter means operable to receive said speckle pattern and to produce two speckle patterns therefrom, and
   half wave plate means operable to control the polarization of one of said two speckle patterns, to thereby produce said two like-polarized speckle patterns.

18. The ring configuration communication system of claim 17 wherein the photorefractive means of each of said receiving portions comprises a photorefractive crystal.

19. The ring configuration communication system of claim 18 wherein each of said receiving portions includes;
   mirror means operable to receive said two like-polarized speckle patterns, and operable to focus said two speckle patterns at a common location on said crystal.

20. The ring configuration communication system of claim 19 wherein said photorefractive crystal is a lithium/niobium/oxygen crystal.

21. A star configuration fiber optic communication system having N communication nodes, and operable to selectively transmitting information from one node to another node, comprising;
   N communication nodes, each node having a transmitter and a receiver,
   an input fiber coupler and an output fiber coupler, each coupler having N physically spaced optical fiber connections and N spaced light beam positions corresponding to said N spaced fiber connections,
   polarizing beam splitter means operable to receive as many as N spaced beams from the beam positions of said input coupler, and operable to split each received beam to follow a reference beam path and a spaced object beam path,
   a half wave plate located in said reference beam path,
   first beam selector means located in said reference beam path,
   second beam selector means located in said object beam path,
   photorefractive means including means operable to focus said reference beam path and said object beam path on said photorefractive means, such that control of said first and second beam selector means to select an object beam from one of a pair of node transmitters and to select a reference beam from another of said pair of node transmitters is operable to write a unique interference pattern in said photorefractive means identifying said pair of nodes as a receiver/transmitter pair, whereby N(N−1) interference patterns are written in said photorefractive means, such that upon said input coupler receiving a light beam that is space domain addressed to a node, said received light beam is diffracted from one of said N(N−1) interference patterns to an addressed one of said optical fiber connections of said output coupler,
   2N elongated multimode optical fibers,
   one half of said optical fibers connecting the transmitter of individual ones of said nodes to individual ones of said optical fiber connections of said input fiber coupler, and
   the other half of said optical fibers connecting the receiver of individual ones of said communication nodes to individual ones of said optical fiber connections of said output fiber coupler,
   each of said transmitting portions comprising;
   a coherent light beam, the collective number N of such light beams being mutually coherent,
   means operable to time domain modulate said light beam so as to containing information to be communicated to a receiver of another node,
   means operable to space domain modulate said light beam so as to address said light beam to said receiver of said another node, and means providing said time/space domain modulated light beam to said input coupler, and
   each of said receiving portions having detector means responsive to time domain modulation of a light beam addressed thereto.

22. The star configuration communication system of claim 21 wherein each of said transmitting portions includes,
   acoustooptic modulator means operable to time domain modulate said light beam, and
   spatial light modulator means operable to address said time domain modulated light beam by space domain modulation thereof.

23. The star configuration communication system of claim 22 wherein said photorefractive means comprises a photorefractive crystal.

24. The star configuration communication system of claim 23 wherein said photorefractive crystal is a lithium/niobium/oxygen crystal.

* * * * *